United States Patent Office 3,686,110
Patented Aug. 22, 1972

3,686,110
1-OXYBENZIMIDAZOLES
Michael H. Fisher, Somerville, Dale R. Hoff, Basking Ridge, and Richard J. Bochis, East Brunswick, N.J., assignors to Meuch & Co., Inc., Rahway, N.J.
No Drawing. Filed Feb. 27, 1970, Ser. No. 15,223
Int. Cl. C07d 99/06
U.S. Cl. 260—302 H
3 Claims

ABSTRACT OF THE DISCLOSURE

Benzimidazoles substituted in the 2- and, optionally, in the 5- and/or 6-positions and characterized by having an ether or ester group in the 1-position are active as anthelmintics and as pesticides.

---

This invention relates to new compositions of matter classifiable in the field of organic chemistry as 2-substituted benzimidazoles. More particularly, this invention relates to 2-substituted benzimidazoles characterized by having an ether or ester group at the 1-position; to methods of making such compounds and to anthelmintic and pesticidal formulations containing such compounds as the essential active ingredient.

In its composition aspect, therefore, the instant invention may be described as residing in the concept of benzimidazoles having the formula:

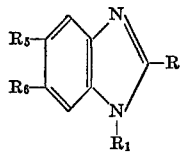

wherein:
R is a member selected from the group consisting of aryl, orthohaloaryl and a heteroaromatic radical containing from 1 to 3 heteroatoms selected from the group consisting of nitrogen, oxygen and sulfur;
$R_5$ and $R_6$ are members selected from the group consisting of hydrogen, loweralkyl, loweralkoxy, loweralkylthio, phenoxy, phenylthio, halo, phenyl, halophenyl, amino loweralkylamino, diloweralkylamino and a heteroaromatic radical containing from 1 to 3 hetero atoms selected from the group consisting of nitrogen, oxygen and sulfur, provided that when $R_5$ and $R_6$ are other than halo at least one of $R_5$ and $R_6$ is hydrogen; and
$R_1$ is a member selected from the group consisting of phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy and the $N_1$, $N_2$ and $N_3$ loweralkoyl derivatives thereof, aminoguanidinoloweralkoxy and the N', $N_1$, $N_2$ and $N_3$ loweralkyl derivatives thereof, imidazolylaminoloweralkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thiazinylaminoloweralkoxy, imidazolino- loweralkoxy and the 1-loweralkyl derivatives thereof, 1,4,5,6- tetrahydropyrimidinoloweralkoxy and the 1-loweralkyl derivatives thereof, loweralkanoyloxy, α-aminocarboxyloweralkoxy, glycosyloxy, p-loweralkylphenacyloxy and p-loweralkoxyphenacyloxy; and alkali metal, alkaline earth metal and pharmaceutically acceptable amine salts thereof when $R_1$ is sulfoloweralkoxy phosphonoloweralkoxy, phosphatoloweralkoxy or α-aminocarboxyloweralkoxy; and salts thereof with pharmaceutically acceptable acids when $R_1$ is C-amidinoloweralkoxy, N-amidinoloweralkoxy, biguanidoloweralkoxy, guanidinoloweralkoxy aminoguanidinoloweralkoxy, imidazolinylaminoloweralkoxy, tetrahydropyrimidinylaminoloweralkoxy, thiazolinylaminoloweralkoxy, thiazinylaminoloweralkoxy imidazolinoloweralkoxy, tetrahydropyrimidinoloweralkoxy or α-aminocarboxyloweralkoxy.

As used above, the term, aryl, is intended to include both monocyclic and bicyclic aryl radicals, such as phenyl and naphthyl. The term, orthohaloaryl, is intended to include both monocyclic and bicyclic ortho haloaryl radicals, such as o-fluorophenyl, o-chlorophenyl, o-fluoronaphthyl, o-chloronaphthyl, and the like. The term, heteroaromatic radical, includes those having one hetero atom in the ring structure, such as thienyl, furyl, pyryl and pyridyl; two heteroatoms in the ring, such as thiazolyl and isothiazolyl; or three heteroatoms such as thiadiazolyl. Whenever used, the terms, loweralkyl, loweralkoxy and lower alkanoyloxy are intended to include both straight and branched chain loweralkyl, loweralkoxy and loweralkanoyloxy groups containing from 1 to 8 carbon atoms in the alkyl, alkoxy or alkanoyloxy moiety. Typical of such loweralkyl, loweralkoxy and loweralkanoyloxy groups are, for example, methyl, ethyl, propyl, isopropyl, n-butyl, amyl, n-hexyl, methoxy, ethoxy, propoxy, isobutoxy, formyloxy, acetyloxy, propionyloxy, isobutyryloxy and n-hexanoyloxy. The term, loweralkanoic acid, is intended to include both straight and branched chain loweralkanoic acids having from 1 to 8 carbon atoms such as, for example, formic, acetic, propionic, isobutyric and n-hexanoic acid. The terms, alkali metal salt and alkaline earth metal salt, are intended to include salts of alkali and alkaline earth metals such as for example, lithium, sodium, potassium, cesium, calcium, magnesium, barium and strontium. Pharmaceutically acceptable amine salts will include those derived from amines such as, for example, ammonia, ethanolamine, diethanolamine, guanidine, arginine, lysine, ethylenediamine, piperazine and morpholine. Typical pharmaceutically acceptable acid salts will include those derived from inorganic acids such as hydrochloric acid, sulfuric acid, phosphoric acid, acetic acid, valeric acid, lactic acid, caproic acid, aspartic acid, glutamic acid, citric acid and tartaric acid.

The instant invention is based upon the discovery that the benzimidazoles described above show inherent applied use characteristics as anthelmintic agents and as pesticides (e.g. bacteriocides, nematocides and particularly as fungicides). The physiological activity of the benzimidazoles of this invention has been confirmed by standard laboratory techniques. It is contemplated that formulations containing the benzimidazoles of this invention as the essential active ingredient will be employed in the treatment and control of helminthiasis in animals and as pesticides. Moreover, it has been found that the 1-ether and 1-ester benzimidazoles of this invention are more soluble in water and/or in lipids and organic solvents than the corresponding 1-unsubstituted compounds and accordingly are more readily usable in liquid formulations.

The 1-ether and 1-ester benzimidazoles of this invention may be prepared by a variety of techniques involving derivatization of the corresponding 1-hydroxy benzimidazoles of the formula:

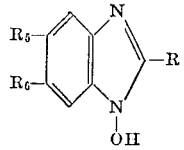

wherein R, $R_5$ and $R_6$ are as defined above. These 1-hydroxy benzimidazoles are compounds well-known in the art and are either available commercially or may be prepared readily by processes already fully described in patent and chemical literature.

The benzimidazoles of this invention wherein the $R_1$ substituent is phosphono loweralkoxy or a loweralkyl ester thereof, sulfoloweralkoxy, loweralkylthioloweralkoxy, imidazolinoloweralkoxy or a 1-loweralkyl derivative thereof, 1,4,5,6-tetrahydropyrimidinoloweralkoxy or a 1-loweralkyl derivative thereof, loweralkanoyloxy, α-aminocarboxyloweralkoxy, glycosyloxy, p-loweralkylphenacyloxy and p-loweralkoxyphenacyloxy may be prepared by treating a solution of the 1-hydroxybenzimidazole starting material in a suitable organic solvent with a haloloweralkylphosphonic acid (preferably in the form of an alkali metal salt), a loweralkyl ester of a haloloweralkylphosphonic acid, a haloloweralkylsulfonic acid (preferaby in the form of an alkali metal salt), a loweralkylthioloweralkyl halide, an imidazolinoloweralkyl halide or 1-loweralkyl derivative thereof, a 1,4,5,6-tetrahydropyrimidinoloweralkyl halide or a 1-loweralkyl derivative thereof, a loweralkanoic acid halide, an α-aminocarboxyloweralkyl halide, a glycosyl halide, an α-halo-p-loweralkoxy-acetophenone or an α-halo-p-loweralkylacetophenone, respectively, in the presence of a base such as an alkali metal alkoxide, an alkali metal hydroxide or sodium hydride. The reaction may be carried out at temperatures ranging from room temperature to 100° C. and usually is complete in about 2 to about 30 hours. The 1-ether and 1-ester benzimidazoles so produced then may be recovered and purified by conventional recrystallization techniques.

Those benzimidazoles of the instant invention wherein the substituent at the 1-position is imidazolylaminoloweralkoxy or a 1-loweralkyl derivative thereof, 1,4,5,6-tetrahydropyrimidinylaminoloweralkoxy or a 1-loweralkyl derivative thereof, thiazolinylaminoloweralkoxy, thiazinylaminoloweralkoxy and guanidinoloweralkoxy may be prepared by treating the corresponding 1-aminoloweralkoxybenzimidazole with 2-methylthio-2-imidazoline or a 1-loweralkyl derivative thereof, 2-methylthio-1,4,5,6-tetrahydropyrimidine or a 1-loweralkyl derivative thereof, 2-methylthio-2-thiazoline, 2-methylthio-2-thiazine or 2-methyl-2-thiopseudourea, respectively. The reaction is carried out in a suitable organic solvent and, conveniently, is carried out by refluxing the reaction mixture for about 12 to about 24 hours. The products may be recovered by evaporation of the reaction mixture followed by conventional purification techniques.

The 1-aminoloweralkoxybenzimidazoles employed in the reaction described above may be obtained by treating a 1-hydroxybenzimidazole starting material in the presence of a base, in the manner already described, with a N-haloloweralkylphthalimide to produce the corresponding 1-(N-phthalimidoloweralkoxy)benzimidazole which, upon treatment with hydrazine hydrate, is converted into the desired 1-aminoloweralkylbenzimidazole. The 1-(N-phthalimidoloweralkoxy)benzimidazole intermediate in a suitable organic solvent is refluxed in the presence of hydrazine hydrate for 1 to 2 hours. Evaporation of the solvent followed by extraction with dilute mineral acid and subsequent basification of the acid extract precipitates the 1-aminoloweralkoxybenzimidazole which is recovered by conventional techniques.

These 1-aminoloweralkoxybenzimidazoles serve as intermediates also for introducing a variety of additional substituents at the 1-position including biguanidoloweralkoxy, aminoguanidinoloweralkoxy, various N-loweralkyl guanidinoloweralkoxy and aminoguanidinoloweralkoxy groups and N-amidinoloweralkoxy and N-loweralkyl derivatives thereof. Thus, the 1-biguanidoloweralkoxy group may be introduced by treating the 1-aminoloweralkoxy-benzimidazole at reflux in an acidic aqueous solvent with dicyanidamide followed by evaporation of the solvent and conventional recovery of the 1-(1-biguanido)loweralkoxy-benzimidazole product. The aminoguanidinoloweralkoxy substituent may be added at the 1-position by treating the 1-aminoloweralkoxybenzimidazole with nitroguanidine at reflux in a suitable organic solvent to obtain the corresponding 1 - nitroguanidinoloweralkoxybenzimidazole which is converted into a desired 1-aminoguanidinobenzimidazole by conventional catalytic reduction.

In order to prepare those benzimidazoles of this invention wherein the 1 - substituent is a N - loweralkyl substituted guanidinoloweralkoxy or aminoguanidinoloweralkoxy group, the 1 - aminoloweralkoxybenzimidazole intermediate (or an N-loweralkyl derivative thereof) first is converted into an appropriately substituted S-loweralkyl-isothiouronium salt by treating the 1-amino (or 1-loweralkylamino)loweralkoxybenzimidazole with a loweralkyl-isothiocyanate or with a diloweralkylthiocarbamoyl halide to form the corresponding 1-(loweralkylthioureidoloweralkoxy)-benzimidazole which then is alkylated by treatment with a loweralkyl halide, preferably methyl iodide, to form the corresponding S-loweralkylisothiouronium salt.

The 1-(N-loweralkylaminoloweralkoxy)benzimidazoles which may be employed in the reactions described above are readily prepared by treating the 1-hydroxybenzimidazole starting materials previously disclosed with a halo-lower alkanol in the manner already described to form the corresponding 1 - hydroxyloweralkoxybenzimidazole which then may be treated with thionyl chloride to form the corresponding 1 - chloroloweralkoxybenzimidazole. Reaction between this compound and a loweralkylamine produces the desired 1 - N-loweralkylaminoloweralkoxy benzimidazole.

The S-loweralkylisothiouronium salts prepared above then may be treated with ammonia or a loweralkamine to displace the loweralkylthio group and form any desired $N_1$-, $N_1$, $N_2$- or $N_1$, $N_2$, $N_3$-loweralkylsubstituted 1-guanidinoloweralkoxybenzimidazole. Similarly, the S-loweralkylisothiouronium salt may be treated with hydrazine or with any desired loweralkyl substituted hydrazine, such as, for example, 1-methylhydrazine, 1,1-diethylhydrazine, 1,1-dimethyl-2-ethylhydrazine and the like, to form corresponding N'-, $N_1$-, $N_2$- and $N_3$-loweralkyl substituted 1-aminoguanidinoloweralkoxybenzimidazoles.

Those benzimidazoles of this invention wherein the substituent at the 1-position is N-amidinoloweralkoxy or an N-loweralkyl derivative thereof may be prepared by treating the 1 - aminoloweralkoxybenzimidazole intermediate with a loweralkyl ortho ester, such as, for example, trimethyl or triethyl orthoformate, orthoacetate, orthopropionate, orthobutyrate and the like, in the presence of a catalytic quantity of hydrochloric acid to form the corresponding methyl or ethyl imino ether which then may be treated with ammonia or a mono- or diloweralkylamine to form the desired 1-N-amidinoloweralkoxybenzimidazole or an N-loweralkyl derivative thereof. The hydrochloric acid catalyst may be added to the reaction mixture in the form of hydrochloric acid per se or, if desired, a catalytic quantity of the hydrochloride salt of the 1-aminoweralkoxybenzimidazole may be employed as the source of the catalyst.

Alternatively, the 1 - N - amidinoloweralkoxybenzimidazoles of this invention, and N-loweralkyl derivatives thereof, may be prepared directly by treating the 1-aminoloweralkoxybenzimidazole intermediate, or a N-loweralkyl derivative thereof, with a loweralkyl imino ester hydrochloride, such as, for example, the hydrochloride of methyl or ethyl formimidate, acetimidate, propionimidate and the like, in a suitable organic solvent. This reaction may be carried out at ambient temperatures and usually is complete in from 12 to 20 hours.

The 1-C-amidinoloweralkoxybenzimidazoles of this invention may be prepared by treating a 1-hydroxybenzimidazole starting material as described above with a haloloweralkylnitrile in the presence of a base to form the corresponding 1 - (cyanoloweralkoxy)benzimidazole. This reaction is carried out by techniques already described. The 1 - (cyanoloweralkoxy)benzimidazole intermediate then may be treated with ethanolic hydrogen chloride solution at about 0° C. to convert the nitrile group in the imino ethyl ester which then may be treated with ammonia or with a mono- or diloweralkylamine to form the desired C-amidinoloweralkoxybenzimidazole or an N-loweralkylnitrile in the presence of a base to form the corresponding amidinoloweralkoxybenzimidazoles so produced may be achieved by direct alkylation of the amidinoloweralkoxy group with a loweralkyl halide, preferably a loweralkyl iodide. The alkylation is usually carried out at reflux in a suitable organic solvent and generally is complete in about 8 to 16 hours. The products may be isolated as the hydroiodide salt or converted into the free base by conventional neutralization techniques.

The 1-loweralkylthioloweralkoxybenzimidazoles of this invention, which are prepared as described above, may be converted into the corresponding sulfoxide or sulfone derivative by oxidizing the 1-loweralkylthioloweralkoxybenzimidazole with an organic peracid such as peracetic acid, trifluoroperacetic acid and metachloroperbenzoic acid. One molar equivalent of the organic peracid is required for formation of the sulfoxide derivative and two molar equivalents of the organic peracid are needed to form the sulfone derivative. The oxidations may be carried out by the required quantity of organic peracid to a cold solution of the 1-loweralkylthiolower-alkoxybenzimidazole in a suitable organic solvent. After the addition of peracid is complete the reaction mixture of peracid is complete the reaction mixture may be allowed to warm to room temperature and is stirred from 6 to 18 hours. After extraction of the reaction mixture with aqueous bicarbonate solution, the products may be recovered from the organic layer by conventional techniques.

Those benzimidazoles of this invention wherein the substituent at the 1-position is phosphatoloweralkoxy may be prepared by treating the corresponding 1-hydroxyloweralkoxybenzimidazole with a mixture of phosphoric acid anhydride and orthophosphoric acid at room temperature for 12–30 hours. Dilution of the reaction mixture with water precipitates the desired benzimidazol-1-yloxyloweralkyl phosphate which may be recovered and purified by conventional techniques. The 1-hydroxyloweralkoxybenzimidazole intermediate may be prepared by treating the 1-hydroxybenzimidazole starting material described above with a haloloweralkanol in the presence of a base in the manner previously described.

Where loweralkyl esters of the 1-phosphatoloweralkoxybenzimidazoles prepared above are desired, the 1-hydroxyloweralkoxybenzimidazole intermediate described above may be treated with a mono- or diloweralkyl phosphoryl halide, preferably the chloride, in a suitable organic solvent. The reaction is carried out at low temperatures, preferably between 0° and 5° C. and is usually complete in about 1 to 4 hours. Dilution of the reaction mixture with water followed by extraction with a suitable organic solvent and evaporation of the organic phase yields the desired 1-phosphatoloweralkoxy loweralkyl ether.

As noted above, those 1-ether benzimidazoles of this invention wherein the 1-substituent is of acidic character, such as sulfoloweralkoxy, phosphono loweralkoxy, phosphatoloweralkoxy and α-aminocarboxyloweralkoxy, will form salts with alkali metals, alkaline earth metals and pharmaceutically acceptable amines. When the 1-ether benzimidazoles of this invention bear a substituent of basic character at the 1 - position, such as C - amidinoloweralkoxy, N - amidinoloweralkoxy, biguanidinoloweralkoxy, guanidinoloweralkoxy, aminoguanidinoloweralkoxy, imidazolylaminoloweralkoxy, 1,4,5,6-tetrahydropyrimidinylaminoloweralkoxy, thiazolinylaminoloweralkoxy, thiazinylaminoloweralkoxy and α - aminocarboxyloweralkoxy, they will form salts with pharmaceutically acceptable acids. Many of these salts display greatly enhanced water solubility as compared with the parent benzimidazole and are highly useful in applications where water soluble formulations are desired. These salts may be formed by conventional techniques such as, for example, by contacting the 1-etherbenzimidazole with the desired acid or base followed by evaporation of the reaction mixture and conventional recovery and purification of the salt.

While all of the 1-ether and 1-ester benzimidazoles of this invention display anthelmintic and pesticidal activity as disclosed above, it will be obvious of course that these compounds will display varying degrees of potency depending upon the nature of the particular application contemplated and the severity of the infestation to be combatted. In general, the preferred benzimidazoles of this invention are those wherein the 1-substituent is phosphonoloweralkoxy, phosphatoloweralkoxy, sulfoloweralkoxy, C-amidinoloweralkoxy, N-amidinoloweralkoxy, biguanidoloweralkoxy, guanidinoloweralkoxy, aminoguanidinoloweralkoxy, imidazolylaminoloweralkoxy, 1,4,5,6 - tetrahydropyrimidinylaminoloweralkoxy, thiazolinylaminoloweralkoxy, thiazinylaminoloweralkoxy, imidazolinoloweralkoxy, 1,4,5,6 - tetrahydropyrimidinoloweralkoxy, α-aminocarboxyloweralkoxy or glycosyloxy. Most preferred are those benzimidazoles of this invention where the substituent at the 2-position is thiazolyl and the substituent at the 1-position is C-amidinoloweralkoxy, N-amidinoloweralkoxy, guanidinoloweralkoxy, phosphonoloweralkoxy or sulfoloweralkoxy.

When the 1-ether and 1-ester benzimidazoles of this invention are employed for the treatment and control of helminthasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 3 to 12 gm. of benzimidazole, may be employed. It is usually preferred, however, to employ unit dosages weighing from 5 to 10 gm. containing from 2 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the 1-ether and 1-ester benzimidazoles of this invention are mixed with a suspending agent such as bentonite and the solid mix is added to water just prior to administration. Alternatively, ready to use drench formulations, such as those described in U.S. Pat. No. 2,918,403, may be employed. Preferred drench formulations containing from about 5 to 50% by weight of the benzimidazole.

The 1-ether and 1-ester benzimidazole described herein also may be administered as a component of the feed of the animals or may be dissolved or suspended in the drinking water. Such compositions comprise the benzimidazole intimately dispersed in an inert carrier of diluent. By inert carrier, is meant one that will not react with the benzimidazole and one that may be administered safely to animals. Preferably, the carrier is one that is, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meals, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the trihalo and tetrahalo benzimidazoles of this invention dispersed in a solid carrier are:

(A) Lbs.

1-amidinomethoxy-2-(4'-thiazolyl)benzimidazole ___ 20
Corn distiller's dried grains _____ 80

(B)

1-[2-(N - formamidino)ethoxy]-2-(4'-thiazolyl)benzimidazole _____ 5
Wheat standard middling _____ 95

(C)

1-[2-(guanidino)ethoxy] - 2 - (4'-thiazolyl)benzimidazole _____ 35
Wheat shorts _____ 65

(D)

2-[2-(4'-thiazolyl)benzimidazol - 1 - yl]oxyethyl sulfonate _____ 50
Corn distiller's grains _____ 50

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of activity will vary depending upon the factors previously mentioned as well as upon the particular benzimidazole employed, the 1-ether and 1-ester benzimidazoles of this invention are usually fed at concentrations of between 0.5 to 2.0% in the feed in order to achieve the desired anthelmintic result.

The 1-ether and 1-esterbenzimidazoles of this invention are effective pesticides in a variety of applications, such as, for example, as bacteriocides, nematocides and particularly as fungicides. Accordingly, they may be employed in the treatment of plants, soils, fruits, seeds, fur, wood, paint, textiles, cosmetics, leather, tobacco, rope, paper, pulp, plastic, fuel, rubber, food and the like.

It should be understood that the benzimidazole compounds may be utilized in diverse formulations, solid, including finely divided powders and granular materials as well as liquid, such as solutions, emulsions, suspensions, concentrations, emulsifiable concentrate, slurries and the like, depending upon the application intended and the formulation media desired. Thus it will be appreciated that benzimidazoles of this invention may be employed to form pesticidally active compositions containing such compounds as essentially active ingredients thereof, which compositions may also include finely divided dry or liquid diluents, extenders, fillers, conditioners and excipients, including various clays, diatomaceous earth, talc, and the like, or water and various organic liquids such as lower alkanols, for example ethanol and isopropanol, or kerosene, benzene, toluene and other petroleum distillate fractions or mixtures thereof.

The quantity of active benzimidazole contained in such formulations will vary widely depending upon the particular benzimidazole employed and the particular application intended. In general, useful formulations will contain from about 1 to about 95% of the active benzimidazole.

It should be understood also that the benzimidazoles of the invention may be used in combination one with the other as well as with other fungicidally active materials. For instance, the benzimidazoles disclosed above may be mixed with sorbic acid or its salts, propionic acid or its salts, mycostatin, sodium diacetate, trichomycin, amphotercin, griseofluvin, undecylenic acid, chloroquinadol, 5,7-dichloro-8-hydroxyquinoline (Vioform), sodium o-phenylphenate, o-phenylphenol, biphenyl, chlorinated phenols, sodium benzoate, dehydroacetic acid and its salts or esters of parahydroxybenzoic acid, such as the methyl and propyl ester (parabens) to give added fungicidal effect when used in appropriate concentrations. It is quite clear, too, that the benzimidazoles of this invention may be used in conjunction with other effective antibacterial materials in appropriate instances so as to combine the action of each in such a situation as to be particularly useful, for instance, in applications where the presence of bacteria creates undesirable results alongside the detrimental action of fungi. Accordingly, a combination of antifungal and antibacterial agents will be useful in the preparation of germicidal soaps, in the production of cosmetics, and in food, such as beer, cheese, or meat and other leather applications.

It has been found that growth of various fungi existing in soil is limited or terminated by the addition to the soil of minor quantities of the benzimidazole compounds described. The term soil as used herein is intended to include all media capable of supporting the growth of plants and may include humus, sand, manure, compost, artificially created plant growth solution, and the like. It has been found also that the benzimidazoles of the invention are effective against fungal diseases of plants and may be effectively used either by direct contact with the foliage or systemically, by introduction through the roots.

The compounds of this invention also have activity against bacteria and plant nematodes and may, at appropriate levels of concentration, be effectively used to inhibit or prevent the growth of these organisms.

As fungicides, the benzimidazoles of the present invention are useful in inhibiting mold growth in fruit such as citrus fruit. The active agent may be applied at any time before consumption and preferably after harvesting. For instance the antifungal may be applied during initial storage, before or after shipping or during final storage before consumption. The benzimidazoles may be utilized in a number of ways in this regard and may be applied either directly to the fruit in an emulsion, solution, suspension or the like or it may be applied to the fruit container or wrapper. Suitable carriers for the active agents are waxes and other materials presently known in the art.

The best mode contemplated by applicants for carrying out their invention is set forth in the following examples; it being understood that these examples are for purposes of illustration merely and no limitation is intended except as set forth in the appended claims.

EXAMPLE 1

2-[2-(4'-thiazolyl)benzimidazol-1-yloxy]-ethyl phosphonic acid

Mix 2.16 gm. of 1-hydroxy-2-(4'-thiazolyl)benzimidazole in 100 ml. of dry dimethylformamide and treat, portion wise, with 0.44 gm. of 54% sodium hydride. Heat the mixture on a steam bath for 15 minutes. Cool the reaction mixture and add 2.32 gm. of disodio 2-bromoethylphosphonic acid. Stir at room temperature for 16 hours. Pour the reaction mixture into water and extract with methylene chloride. Separate the aqueous layer and evaporate to a small volume. Acidify with dilute hydrochloric acid. Separate the product by filtration to obtain substantially pure 2-[2-(4'-thiazolyl)benzimidazol-1-yloxy]ethyl phosphonic acid.

EXAMPLE 2

Diethyl 2-[2-(4'-thiazolyl)benzimidazol-1-yloxy]ethyl phosphonate

React 2.16 gm. of 1-hydroxy-2(4'-thiazolyl)benzimidazole, 0.44 gm. of 54% sodium hydride and 2.44 gm. of diethyl 2-bromoethylphosphonate, as in Example 1. Similar work-up will yield diethyl 2-[2(4'-thiazolyl)benzimidazol-1-yloxy]ethyl phosphonate.

EXAMPLE 3

2-(4'-thiazolyl)benzimidazol-1-yloxymethyl methyl sulfide

Mix 7.0 gm. of 1 hydroxy-2-(4'-thiazolyl)benzimidazole in 100 ml. of dry dimethyl formamide and treat, portion wise, with 1.7 gm. of 54% sodium hydride. Heat the resultant suspension on the steam bath for fifteen minutes to the cooled reaction mixture, add 3.4 gm. of chloromethyl methyl sulfide dissolved in 5 ml. of dimethyl formamide and stir at room temperature for 16 hours. Pour onto 1200 ml. of water and extract with chloroform. After washing and drying evaporate the organic layer vacuo and recrystallize the residue from n-hexane to yield 2-(4'-thiazolyl)benzimidazol-1-yloxymethyl methyl sulfide. (M.P. 71–73° C.)

EXAMPLE 4

1-(α-p-methoxyphenacyloxy)-2-(4'-thiazolyl) benzimidazole

A solution of the sodio salt of 1-hydroxy 2-(4'-thiazolyl)benzimidazole from 0.542 gm. (0.0025 mole) of 1-hydroxy 2-(4'-thiazolyl)benzimidazole and 125 gm. of sodium hydride in 10 ml. of dry dimethyl formamide is prepared as in Example 1. To the cooled suspension is added 0.641 gm. (.0028 mole) of α-bromo-p-methoxyacetophenone, dissolved in 2 mls. of dry dimethyl formamide. The reaction mixture is stirred at room temperature for 2 hours and poured onto 200 gms. of ice water mixture. The solids are collected by filtration, washed with water and dried in vacuo.

Recrystallization from ethyl acetate yields pure 1-(α-p-methoxy) - 2 - (4'-thiazolyl)benzimidazole. (M.P. 167–168° C.)

EXAMPLE 5

1-(α-p-isopropylphenacyloxy)-2-(4'-thiazolyl) benzimidazole

React 0.542 gm. of 1-hydroxy-2-(4' - thiazolyl)benzimidazole, 125 gms. of 54% sodium hydride and 0.250 gm. of α-bromo-p-isopropyl acetophenone as in Example 4, to obtain 1-(α-p-isopropylphenacyloxy)-2-(4'-thiazolyl)benzimidazole.

EXAMPLE 6

1-[(imidazolin-2-yl)methyleneoxyl]-2-(4'-thiazolyl) benzimidazole

A solution of the sodio salt of 1-hydroxy-2-(4'-thiazolyl)benzimidazole, prepared as in Example 1, is treated with a dimethylformamide solution of 2-(chloromethyl)imidazoline. The reaction mixture is heated on the steam bath for 2 hours, cooled and poured onto ice water. The resultant mixture is extracted with chloroform and the extracts are washed with water, dried, and evaporated in vacuo. The residue is dissolved in $CHCl_3$ and anhydrous hydrogen chloride yields the crude dihydrochloride salt. Recrystallization from ethanol yields purified 1-[(imidazolin-2-yl)methyleneoxyl]-2,4 - thiazolyl) benzimidazole dihydrochloride.

EXAMPLE 7

1-(1,4,5,6-tetrahydropyrimidin-2-ylmethylene oxy)-2-(4'-thiazolyl)benzimidazole

By repeating the process of Example 6 and substituting an equivalent quantity of 2-(bromomethyl)-1,4,5,6-tetrahydropyrimidine for the 2-(chloromethyl)imidazoline, 1-(1,4,5,6-tetrahydropyrimidin-2-ylmethyleneoxy) - 2 - (4'-thiazolyl)benzimidazole is obtained as the dihydrochloride salt.

EXAMPLE 8

1-[(1-methyl-1,4,5,6-tetrahydropyrimidin-2-yl)methyleneoxyl]-2-(4'-thiazolyl)benzimidazole Repeat the rpocess of Example 6 substituting an equivalent quantity of 2-bromomethyl-1-methyl-1,4,5,6-tetrahydropyrimidine for the 2-(chloromethyl)imidazoline to obtain 1-[(1-methyl-1,4,5,6-tetrahydropyrimidin - 2 - yl) methyleneoxy]-2-(4'-thiazolyl)benzimidazole as the dihydrochloride salt.

EXAMPLE 9

1-[(1-ethyl-2-imidazolin-2-yl)methyleneoxyl]-2-(4'-thiazolyl)benzimidazole

Repeat the process of Example 6 substituting an equivalent quantity of 2-(chloromethyl)-1-ethylimidazoline to obtain 1-[(1-ethyl-2-imidazolin-2-yl)methyleneoxy] - 2-(4'-thiazolyl)benzimidazole as the dihydrochloride salt.

EXAMPLE 10

Sodium 2-[2-(4'-thiazolyl)benzimidazolyl-1-yl]-oxyethylsulfonate

A rigorously stirred suspension of 5.21 gm. (.024 moles) 1-hydroxy-1-(4'-thiazolyl)benzimidazole in 80 ml. of dried dimethyl formamide is treated at ambient temperatures with 1.2 gm. of a 54% oil dispersion of sodium hydried. The reaction mixture is then heated on a stream bath for 15 minutes until evolution of hydrogen has ceased. The cooled reaction mixture is treated with a slurry of 5.78 gm. (0.26 mole) of sodium 2-bromomethane sulfonate in 120 ml. of dried dimethyl formamide and the resultant suspension is heated on stream bath for 2 hours. Sixteen hundred milliliters of ethyl ether is added to the cooled reaction mixture. The mixture is stirred until solidification occurs and then solids are collected by filtration and washed with ether. Recrystallization from ethanol-ethyl acetate (50/50) by volume) mixture yields purified sodium -2-[2-(4' - thiazolyl)benzimidazol - 1]oxyethylsulfonate dihydrate. (M.P. 277° C.)

The free sulfonic acid may be obtained by dissolving 0.4 gm. of the pure sodium salt in 4 ml. of water and acidifying the solution with dilute hydrochloric acid. The free acid is separated by filtration and washed with water after drying at 100° in vacuo the compound melts at 272° C.

The free acid may be converted to its salts by suspending the free acid in methanol and adding excess base. Deletion of the resultant solution with ether yields the salt of the sulfonic acid.

Inorganic bases such as sodium hydroxide potassium hydroxide and lithium hydroxide, as well as organic bases such as diethylamine, ethanolamine or iminodiethanol may be used.

EXAMPLE 11

1-acetoxy-2-(4'-thiazolyl)benzimidazole

A solution of 1.08 gm. (.005 mole) of 1-hydroxy-2-(4'-thiazolyl)benzimidazole in 10 ml. of pyridine, cooled to 0° C. is treated, dispersed with 0.400 gm. (.008 mole) of acetyl chloride. The resultant suspension is allowed to warm to room temperature and stirred for 2 hours. The reaction mixture is poured onto 200 gms. of ice water mixture and aged in the cold. The solids are separated by filtration, washed with water and dried in vacuo. Recrystallization from n-hexane yields pure 1-acetoxy-2-(4'-thiazolyl)benzimidazole. (M.P. 94–95° C.).

Substitution of the acetyl chloride used above with an equivalent quantity of propionyl chloride or n-butyryl yields the propionyloxy or n-butyryloxy analogues.

EXAMPLE 12

3-[2-(4'-thiazolyl)]benzimidazol-1-yloxy-2-aminopropionate

React 2.1 gm. of 1-hydroxy-2-(4'-thiazolyl)benzimidazol 1.7 gm. of 54% sodium hydride and 1.5 gm. of sodium-3-chloro-2-aminopropionate are reacted as in Example 10 to obtain 3[2-(4'-thiazolyl)benzimidazole - 1-yloxy-2-aminopropionate.

EXAMPLE 13

2-(4'-thiazolyl)benzimidazol-1-yloxy-α-D-glucoside

Using the same reaction as in Example 3, but substituting an equivalent quantity of 1-bromo-2,3,4,6-tetraacetyl-α-D-glucose, one obtains the 1-(2,3,4,6-tetraacetyl-α - D-glucosyl-1-oxy)-2-(4'-thiazolyl)benzimidazole. The tetraacetyl compound is stirred at room temperature with dilute sodium hydroxide for 16 hours. Acidification of the reaction mixture yields 2-(4'-thiazolyl)benzimidazol-1-yloxy-α-D-glucoside.

EXAMPLE 14

1-(2-hydroxy)ethoxy-2-(4'-thiazolyl)benzimidazole

Mixing 2.16 gm. of 1-hydroxy-2-(4'-thiazolyl)benzimidazole, 1.7 gm. of sodium hydride and 5.92 gm. of bromoethanol as in Example 3, but allowing reaction time to be shortened to 2 hours and reaction temperature to steam bath, one obtains 1-(2-hydroxy)ethoxy-2-(4'-thiazolyl)benzimidazole. (M.P. 137–138° C.).

EXAMPLE 15

1-(2'-cyanomethoxy)-2-(4'-thiazolyl)benzimidazole

Reaction 2.10 gm. of 1-hydroxy-2-(4'-thiazolyl)benzimidazole, 0.44 gm. of 54% sodium hydride and 0.75 gm. of chloroacetonitrile as in Example 3, one obtains 1-(2'-cyanomethoxy)-2-(4'-thiazolyl)benzimidazole.

EXAMPLE 16

1-(β-aminoethoxy)-2-(4'-thiazolyl)benzimidazole

A stirred suspension of 3.92 gm. (0.018 mole) of 1-hydroxy-2-(4'-thiazolyl)benzimidazole in 60 ml. of dry dimethyl formamide is treated at ambient temperatures with 0.900 gm. of a 54% oil dispersion of sodium hydride. The resultant suspension is heated on steam bath for 15 minutes until evolution of hydrogen has ceased. The cooled reaction mixture is treated with 5.05 gm. (0.0198) of β-bromo ethyl phthalimide in 15 ml. of dry dimethyl formamide and the resultant solution is heated in the steam bath for 2 hours. The reaction mixture is cooled and poured onto 500 gm. of an ice water mixture and the solids separated by filtration. After washing with cold water, the crude phthalimido derivative is dried in vacuo. Recrystallization from ethanol yields pure 1-(β-phthalimido-ethoxy)-2-(4'-thiazolyl)benzimidazole. (M.P. 174–175° C.)

A solution of the crude phthalimido derivative (2 gm.), dissolved in 100 ml. of 95% ethanol containing 8 drops of water is treated with 0.7 ml. of 95% hydrazine and reflux for 2 hours. The solvent is evaporated and the residue distributed between chloroform and 5% aqueous sodium hydroxide. The organic layer is separated; dried over magnesium sulfate, and evaporated by vacuo to yield 1-(β-aminoethoxy)-2-(4'-thiazolyl)benzimidazole as a yellow oil. Analysis and spectral properties are in accord with the structure.

The amine may be converted to the oxalate salt in the usual manner. Recrystallization from ethanol yields pure 1 - (β - aminoethoxy)-2-(4'-thiazolyl)benzimidazole oxalate. (M.P. 244° C.)

EXAMPLE 17

1-[1-(6-amino)hexyloxy]-2-(4'thiazolyl)benzimidazole

Using the same procedure as described in Example 16, but substituting 1-phthalimido-6-bromohexane, one obtains the 1-[1(6-amino)hexyloxy]-2-(4'-thiazolyl)benzimidazole as the oxalate salt. (M.P. 177° C.)

EXAMPLE 18

1-[2-(imidazolin-2-ylamino)ethoxy]-2-(4'thiazolyl)benzimidazole

A solution of 2.6 gms. of 1-(2-aminoethoxy)-2-(4'-thiazolyl)benzimidazole and 2.44 gms. of 2-methylthio-2-imidazolidine hydroiodide in 60 ml. of ethanol is heated at reflux for 16 hours. The solvents are removed in vacuo and the residue is triturated with a small amount of water. The solids are removed by filtration and washed with cold water. Recrystallization of the crude product from ethanol yields 1-[2-(imidazolin-2-ylamino)ehtoxy]-2-(4'-thiazolyl)benzamidazole as the hydroiodide salt.

EXAMPLE 19

1-[2-(1-methylimidazolin-2-ylamino)ethoxy]-2-(4'-thiazolyl)benzimidazole

From the reaction of 2.6 gm. of 1-(2-aminoethoxy)-2-(4'-thiazolyl)benzimidazole and 2.5 gms. of 1-methyl-2-methylthio-2-imidazoline hydroiodide under the conditions of Example 18, one obtains the 1-[2-(1-methylimidazolin - 2 - ylamino)ethoxy] - 2 - (4'-thiazolyl)benzimidazole.

EXAMPLE 20

1-[2-(1,4,5,6-tetrahydropyrimidin-2-ylamino)ethoxy]-2-(4'-thiazolyl)benzimidazole By repeating the process of Example 18 and substituting an equivalent quantity of 2-methylthio-1,4,5,6-tetrahydropyrimidine hydroiodide for the 2-methylthio-2-imidazoline hydroiodide, one obtains 1-[2-(1,4,5,6-tetrahydropyrimidin - 2 - ylamino)ethoxy]-2-(4'-thiazolyl)benzimidazole as the hydroiodide salt.

EXAMPLE 21

1-[2-(1-methyl-1,4,5,6-tetrahydropyrimidin-2-ylamino) ethoxy]-2-(4'-thiazolyl)benzimidazole By using an equivalent quantity of 1-methyl-2-methylthio-1,4,5,6-tetrahydropyrimidine hydroiodide in place of the 2-methylthio-2-imidazoline hydroiodine in Example 18, one obtains 1-[2-(1-methyl-1,4,5,6-tetrahydropyrimidin - 2-ylamino)ethoxy]-2-(4'-thiazolyl)benzimidazole as the hydroiodide salt.

EXAMPLE 22

1-[1-(2-thiazolin-2-ylamino)ethoxy]-2-(4'-thiazolyl)benzimidazole

By repeating the process of Example 18 and substituting an equivalent quantity of 2-methylthio-2-thiazoline hydroiodide for the 2-methylthio-2-imidazoline hydroiodide, one obtains 1-[1-(2-thiazolin-2-ylamino)ethoxy]-2-(4'-thiazolyl)benzimidazole as the hydroiodide salt.

EXAMPLE 23

1-[1-(2-guanidino)ethoxy]-2-(4'-thiazolyl)benzimidazole

A solution of 2.6 gms. of 1-(2-aminoethoxy)-2-(4'-thiazolyl)benzimidazole and 2.78 gms. of 2-methyl-2-thiopseudourea sulfate in 50 ml. of 50% aqueous ethanol, is refluxed for 16 hours. After evaporating the solvent, the residue is taken up in water, made strongly basic with 50% aqueous sodium hydroxide and the mixture is extracted with chloroform. The chloroform layer is separated, dried and anhydrous hydrogen chloride is introduced. The crude dihydrochloride salt is removed by filtration and washed twice with ether. Recrystallization from ethanol-ether mixture yields 1-[2-(2-guanidino)ethoxy]-2-(4'-thiazolyl)benzimidazole as the dihydrochloride salt.

EXAMPLE 24

1-[2-(1-biguanido)ethoxy]-2-(4'thiazolyl)benzimidazole

Reflux a solution of 2.61 gms. of 1-(2-aminoethoxy)-2-(4'-thiazolyl)benzimidazole and 0.84 gm. of dicyanoamide in 100 ml. of water, containing 12 ml. of concentrated hydrochloric acid for one hour. Evaporate the solvent to a small volume and cool. Filter off 1-[3-(1-biguanido)ethoxy]-2-(4'-thiazolyl)benzimidazole as the hydrochloride salt.

EXAMPLE 25

1-[2-(N-aminoguanidino)ethoxy]-2-(4'-thiazolyl)benzimidazole

Reflux a solution of 1-(2-aminoethoxy)-2-(4'-thiazolyl)benzimidazole, 2.61 gm., and 1.04 gm. of nitroguanidine in 100 ml. of ethanol for 3 hours. Evaporation of the ethanol solvent yields crude 1-[2-(N-nitroguanidino)ethoxy]-2-(4'-thiazolyl)benzimidazole. Dissolve the N-nitroguanidino product in ethanol and reduce with 10% palladium on carbon catalyst until 3 moles of hydrogen are absorbed. Remove the catalyst by filtration and evaporate the reaction mixture in vacuo. Dissolve the residue in ethanol, containing an excess of anhydrous hydrogen chloride and dilute with ether to yield 1-[2-(N-aminoguanidino)ethoxyl]-2-(4'-thiazolyl)benzimidazole as the dihydrochloride salt.

EXAMPLE 26

1-[2-(1,3-dimethylguanidin-2-yl)ethoxy]-2-(4'-thiazolyl)benzimidazole

A solution of 1.3 gm. of 1 - (2 - aminoethoxy)-2-(4'-thiazolyl)benzimidazole in 100 ml. of methylene chloride is treated with 50 ml. of a methylene chloride solution of 0.800 mg. of methyl isothiocyanate. The reaction is stirred for 16 hours at room temperature. The solvents are evaporated to dryness in vacuo and the residue is chromotographed over silica gel. Elution with ethyl acetate yields the purified - 1 [β - (1 - methylthioureido)ethoxy]-2-(4'-thiazolyl)benzimidazole.

The thiourea is alkylated in a refluxing acetone containing 1 mole of methyl iodide. Evaporation of the solvent yields the crude S-methylisothiouronium hydroiodide salt. The salt is dissolved in ethanol and excess methyl amine is bubbled into the ethanol solution on a steam bath. Evaporation of the ethanol solvent and recrystallization of the residue yields 1 - [2 - (1,3 - dimethyl guanidino - 2 - yl)ethoxy] - 2 - (4' - thiazolyl)benzimidazole as the hydroiodide salt.

EXAMPLE 27

1-[2-(1-methyl-2-guanidino)ethoxy]-2-(4'-thiazolyl)benzimidazole

Repeat the process of Example 26 treating the S-methylisothiouronium salt with anhydrous ammonia instead of methylamine to obtain 1 - [2 - (1 - methyl - 2 - guanidino)ethoxy]-2-(4'-thiazolyl)benzimidazole.

EXAMPLE 28

1-[2-(3-amino-1-methyl-2-guanidino)ethoxyl]-2-(4'-thiazolyl)benzimidazole

Reflux the S-isothiouronium salt from Example 26 with an equimolar quantity of anhydrous hydrazine in ethanol for 3 hours. Evaporate the solvent, take up the residue in chloroform and bubble in hydrogen chloride. Dilute with ether and filter off the dihydrochloride salt of 1-[2-(3 - amino - 1 - methyl - 2 - guanidino)ethoxy] - 2 - (4'-thiazolyl)benzimidazole.

EXAMPLE 29

1-[2-(3-methylamino-1-methyl-2-guanidino)ethoxy]-2-(4'-thiazolyl)benzimidazole

Repeat the process of Example 28, using an equivalent quantity of 1-methylhydrazine in place of hydrazine, to obtain 1 - [2 - (3 - methylamino - 1 - methyl - 2 - guanidino)ethoxy]-2-(4'-thiazolyl)benzimidazole.

EXAMPLE 30

1-[2-(3-dimethylamino-1-methyl-2-guanidino)ethoxy]-2-(4'-thiazolyl)benzimidazole Repeat the process of Example 28, using an equivalent quantity of 1,1-dimethylhydrazine in place of hydrazine, to obtain 1 - [2 - (3 - dimethylamino - 1 - methyl - 2-guanidino)ethoxy]-2-(4'-thiazolyl)benzimidazole.

EXAMPLE 31

1-[2-(1,3-dimethyl-1-dimethylamino-2-guanidino)ethoxy]-2-(4'-thiazolyl)benzimidazole Repeat the process of Example 28, using an equivalent quantity of 1,1,2 - trimethylhydrazine in place of hydrazine, to obtain 1 - [2 - (1,3 - dimethyl - 1 - dimethylamino-2-guanidino)ethoxy]-2-(4'-thiazolyl)benzimidazole.

EXAMPLE 32

1-(2-chloroethoxy)-2-(4'-thiazolyl)benzimidazole

Reflux a solution of 500 mg. of 1 - (2 - hydroxyethoxy)-2 - (4' - thiazolyl)benzimidazole from Example 14 and 1 ml. of thionylchloride in 10 ml. of methylene chloride for 1 hour. Evaporate the solvent and recrystallize the residue from ethylacetate to obtain 1 - (2 - chloroethoxy)-2-(4'-thiazolyl)benzimidazole. (M.P. 136–137° C.).

Any desired 1 - hydroxyloweralkoxybenzimidazole as prepared according to Example 14 by the reaction of the corresponding 1-hydroxybenzimidazole with a haloloweralkanol, may be chlorinated by the technique described above to obtain the 1-chloroloweralkoxy derivative.

EXAMPLE 33

1-(2-methylaminoethoxy)-2-(4'-thiazolyl)benzimidazole

Heat a solution of 325 mg. of 1 - (2 - chloroethoxy)-2 - (4' - thiazolyl)benzimidazole an 73 mg. of methylamine in 5 ml. of ethanol on a steam bath for 2 hours. Evaporate the solvent and recrystallize the residue from hexane to obtain 1 - (2 - methylaminoethoxy) - 2 - (4'-thiazolyl)benzimidazole.

An equivalent quantity of any desired loweralkylamine may be substituted for the methylamine used above to introduce the corresponding loweralkylaminoloweralkoxy group at the 1-position.

EXAMPLE 34

1-[2-(1,2-dimethyl-2-guanidino)ethoxy]-2-(4'-thiazolyl)benzimidazole

Following the procedure of Example 26, react 1-(2-methylaminoethoxy) - 2 - (4' - thiazolyl)benzimidazole with methylisothiocyanate to obtain 1 - [β - (1,3 - dimethylthioureido)ethoxy] - 2 - (4' - thiazolyl)benzimidazole. Alkylate the thiourea with methyliodide to obtain the crude S-methylisothiouronium hydroiodide salt and treat with anhydrous ammonia as in Examples 26 and 27 to obtain 1 - [2 - (1,2 - dimethyl - 2 - guanidino)-ethoxy]-2-(4'-thiazolyl)benzimidazole.

EXAMPLE 35

1-[2-(-1,2,3-trimethyl-2-guanidino)ethoxy]-2-(4'-thiazolyl)benzimidazole

Repeat the process of Example 34, using methylamine in place of ammonia, to obtain 1 - [2 - (1,2,3 - trimethyl-2-guanidino)ethoxy]-2-(4'-thiazolyl)benzimidazole.

EXAMPLE 36

1-[2-(3-amino-1,2-dimethyl-2-guanidino)ethoxy]-2-(4'-thiazolyl)benzimidazole

Following the procedure of Example 28, react the S-methylisothiouronium salt from Example 34 with hydrazine to obtain 1 - [2 - (3 - amino - 1,2 - dimethyl - 2-guanidino)ethoxy]-2-(4'-thiazolyl)benzimidazole.

EXAMPLE 37

1-[2-(1,2-dimethyl-3-methylamino-2-guanidino)ethoxy]-2-(4'-thiazolyl)benzimidazole Following the procedure of Example 28, react the S-methylisothiouronium salt from Example 34 with an equivalent quantity of 1-methylhydrazine in place of hydrazine to obtain 1 - [2 - (1,2 - dimethyl - 3 - methylamino - 2 - guanidino)ethoxy] - 2 - (4' - thiazolyl)benzimidazole.

EXAMPLE 38

1-[2-(1,2-dimethyl-2-dimethylamino-2-guanidino)ethoxy]-2-(4'-thiazolyl)benzimidazole Following the procedure of Example 28, react the S-methylisothiouronium salt from Example 34 with an equivalent quantity of 1,1-dimethylhydrazine in place of hydrazine to obtain 1 - [2 - (1,2 - dimethyl - 2 - dimethylamino - 2 - guanidino)ethoxy] - 2 - (4' - thiazolyl)benzimidazole.

EXAMPLE 39

1-[2-(1,2,3-trimethyl-1-dimethylamino-2-guanidino)ethoxy]-2-(4'-thiazolyl)benzimidazole Following the procedure of Example 28, react the S-methylisothiouronium salt from Example 34 with an equivalent quantity of 1,1,2-trimethylhydrazine in place of hydrazine to obtain 1-[2-(1,2,3-trimethyl-1-dimethylamino-2-guanidino)ethoxy] - 2 - (4'-thiazolyl)benzimidazole.

EXAMPLE 40

1-[2-(1,1-dimethyl-2-guanidino)ethoxy]2-(4'-thiazolyl)benzmidazole

Following the procedure of Example 26, react 1-(2-aminoethoxy) - 2-(4'-thiazolyl)benzimidabole with an equivalent quantity of dimethylthiocarbamoyl chloride in place of methylisothiocyanate to obtain 1-[β-(3,3-dimethtylthioureido)ethoxy] - 2 - (4'-thiazolyl)benzimidazole. Alkylate the thiourea with methyliodide to obtain the crude S-methylisothiouronium hydroiodide salt and treat with anhydrous ammonia as in Examples 26 and 27 to obtain 1-[2-(1,1-dimethyl-2-guanidino)ethoxy]-2-(4'-thiazolyl)benzimidazole.

EXAMPLE 41

1-[2-(1,1,3-trimethyl-2-guanidino)ethoxy]-2-(4'-thiazolyl)benzimidazole

Repeat the process of Example 40, usnig methylamine in place of ammonia to obtain 1-[2-(1,1,3-trimethyl-2-guanidino)ethoxy]-2-(4'-thiazolyl)benzimidazole.

EXAMPLE 42

1-[2-(3-amino-1,1-dimethyl-2-guanidino)ethoxy]-2-(4'-thiazolyl)benzimidazole

Following the procedure of Example 28, react the S-methylisothiouraonium salt from Example 40 with an drazine to obtain 1-[2-(3-amino-1,1-dimethyl-2-guaniguanidino)ethoxy]-2-(4'-thiazolyl)benzimidazole.

EXAMPLE 43

1-[2-(3-methylamino-1,1-dimethyl-2-guanidino)ethoxy]-2-(4'-thiazolyl)benzimidazole Following the procedure of Example 28, react the S-methylisothiouronium salt from Example 40 with an equivalent quantity of 1-methylhydrazine in place of hydrazine to obtain 1-[2-(3-methylamino-1,1-dimethyl-2-guanidino)ethoxy]-2(4'-thiazolyl)benzimidazole.

EXAMPLE 44

1-[2-(3-dimethylamino-1,1-dimethyl-2-guanidino)ethoxy]-2-(4'-thiazolyl)benzimidazole Following the procedure of Example 28, react the S-methylisothiouraonium salt from Example 40 with an equivalent quantity of 1,1-dimethylhydrazine in place of hydrazine to obtain 1-[2-(3-dimethylamino-1,1-dimethyl-2-guanidino)ethoxy]-2-(4'-thiazolyl)benzimidazole.

EXAMPLE 45

1-[2-(1,1,2-trimethyl-2-dimethylamino-3-guanidino)ethoxy]-2-(4'-thiazolyl)benzimidazole Following the procedure of Example 28, react the S-methylisothiouronium salt from Example 40 with an equivalent quantity of 1,1,2-trimethylhydrazine in place of hydrazine to obtain 1-[2-(1,1,2-trimethyl-2-dimethylamino-3-guanidino)ethoxy]-2 - (4' - thiazolyl)benzimidazole.

EXAMPLE 46

1-[2-(N-methyl-N'-formamidino)ethoxy]-2-(4'-thiazolyl)benzimidazole

Mix 1.04 gm. of 1-(2-aminoethoxy)-2-(4'-thiazolyl)benzimidazole, 0.888 gm. triethylorthoformate and 0.026 gm. of 1-(2-aminoethoxy)-2-(4'-thiazolyl)benzimidazole dihydrochloride and heat to reflux with a distillation column attached. Separate the ethanol which is produced by fractional distillation. When the distillation of ethanol is complete, evaporate the excess triethylorthoformate in vacuo. The residue is ethyl-N-[2-(4'-thiazolyl)benzimidazol-1-yl-oxyethylformimidate and is used without further purification.

Dissolve the residue in benzene and while heating on the steam bath, anhydrous methyl amine is bubbled into the reaction mixture. After ½ hour, the solvent is evaporated in vacuo and the residue is chromatographed as silica gel. Elute with varying amounts (from 1% methanol–99% chloroform to 10% methanol, 90% chloroform mixtures) solvent, to obtain purified 1-[2-(N-methyl-N'-formamidino)ethoxy] - 2-(4' - thiazolyl)benzimidazole.

EXAMPLE 47

1-[2-(N-methyl-N'-acetamidino)ethoxy]-2(4'-thiazolyl)benzimidazole

By reacting 1-(2-aminoethoxy)-2-(4'-thiazolyl)benzimidazole with triethylorthoracetate according to Example 46, one obtains the intermediate ethyl-N-[2-(4'-thiazolyl)benzimidazole-1-yloxyethtyl]-acetimidate which is reacted with methyl amine as in Example 46 to obtain 1-[2-(N - methyl-N' - acetamidino)ethoxy]-2-(4'-thiazolyl)benzimidazole.

EXAMPLE 48

1-[2-(N',N'-dimethyl-N-formamidino)ethoxy]-2-(4'-thiazolyl)benzimidazole

React 1-(2-aminoethoxy) - 2-(4'-thiazolyl)benzimidazole with triethylorthoformate as in Example 46, but bubble in dimethylamine instead of methyl amine to obtain 1-[2-(N',N'-dimethyl-N-formamidino)ethoxy]-2-(4'-thiazolyl)benzimidazole.

EXAMPLE 49

1-[2-N,N'-dimethyl-N'-acetamidino)ethoxy]-2-(4'-thiazolyl)benzimidazole

React 1-(2-aminoethoxy) - 2-(4'-thiazolyl)benzimidazole and trimethylorthoacetate as in Example 46 and bubble in dimethylamine, instead of methyl amine to yield 1-[2-(N,N'-dimethyl-N'-acetamidino)ethoxy] - 2 - (4'-thiazolyl)benzimidazole.

EXAMPLE 50

1-[2-N-formamidino)ethoxy]-2-(4'-thiazolyl)benzimidazole

React 1 - (2-aminoethoxy) - 2 - (4'-thiazolyl)benzimidazole, Example 46, with triethtylorthoformate but bubble in ammonia instead of methylamine to yield 1-[2-(N-formamidino)ethoxy]-2-(4'-thiazolyl)benzimidabole.

EXAMPLE 51

1-[2-(N-acetamidino)ethoxy]-2-(4'-thiazolyl)benzimidazole

React 1-(2-aminoethoxy) - 2-(4'-thiazolyl)benzimidazole with triethylorthoacetate as in Example 46, but bubble in ammonia instead of methylamine to yield 1-[2-(N - acetamidino)ethoxy]-2 - (4'-thiazolyl)benzimidazole.

EXAMPLE 52

1-[2-(N-acetamidino)ethoxy]-2-(4'-thiazolyl)benzimidazole

Dissolve 1.04 gm. of 1-(2-aminoethoxy)-2-(4'-thiazolyl)benzimidazole and 0.500 g. of ethylacetimidate hydrochloride in 20 ml. of ethanol. Stir the reaction mixture at room temperature for 16 hours. Evaporate the solvent and triturate with ether. Separate the product, as the hydrochloride salt by filtration and wash with ether. Suspend the material between chloroform and a water-ice mixture and treat with 50% sodium hydroxide. Separate, dry and evaporate the organic layer to yield 1-[2-(N-acetamidino)ethoxy]-2-(4'-thiazolyl)benzimidazole as an oil.

EXAMPLE 53

1-[2-(N-methyl-N-acetamidino)ethoxy]-2-(4'-thiazolyl)benzimidazole

React 1.05 gm. of 1-(2-methylaminoethoxy)-2-(4'-thiazolyl)benzimidazole as in Example 52 to yield 1-[2-(N-methyl-N-acetamidino)ethoxy] - 2 - (4'-thiazolyl)benzimidazole.

Similarly if 475 mg. of ethyl formimidate hydrochloride is substituted for the ethyl acetimidate hydrochloride the product is 1-[2-(N-methyl-N-formamidino)ethoxy]-2-(4'-thiazolyl)benzimidazole.

EXAMPLE 54

1-amidinomethoxy-2-(4'-thiazolyl)benzimidazole

Stir 1.0 gm. of the 1-cyanomethoxy-2-(4'-thiazolyl)-benzimidazole from Example 15 in 150 ml. ethanolic hydrogen chloride solution at 0° C. for 16 hours. Dilute the reaction mixture with ether and separate the precipitate by filtration to obtain ethyl 2-(4'-thiazolyl)benzimidazol-1-yloxyacetimidate dihydrochloride.

Without further purification, heat an ethanol solution of the acetimidate obtained above on a steam bath and bubble anhydrous ammonia through the solution for 1 hour. Evaporate the solvent and recrystallize the residue from ethanol to obtain 1-amidinomethoxy-2-(4'-thiazolyl)benzimidazole as the dihydrochloride salt.

EXAMPLE 55

1-(N-methylamidinomethoxy)-2-(4'-thiazolyl)benzimidazole

Following the procedure of Example 54, treat ethyl 2-(4'-thiazolyl)benzimidazol - 1 - yloxyacetimidate with methylamine in place of ammonia to obtain 1-(N-methylamidinomethoxy)-2-(4'-thiazolyl)benzimidazole.

EXAMPLE 56

1-(N,N-dimethylamidinomethoxy)-2-(4'-thiazolyl)benzimidazole

Following the procedure of Example 54, react ethyl 2-(4'-thiazolyl)benzimidazol-1-yloxyacetimidate with dimethylamine in place of ammonia to obtain 1-(N,N-dimethylamidinomethoxy)-2-(4'-thiazolyl)benzimidazole.

EXAMPLE 57

1-(N,N'-dimethylamidinomethoxy)-2-(4'-thiazolyl)benzimidazole

Reflux an acetone solution of 1-(N-methylamidinomethoxy)-2-(4'-thiazolyl)benzimidazole with an equimolar quantity of methyl iodide for 12 hours. Evaporate the solvent and recrystallize the residue from ethanol to obtain 1-(N,N'-dimethylamidinomethoxy) - 2 - (4'-thiazolyl)-benzimidazole as the hydroiodide salt.

EXAMPLE 58

1-(N,N,N'-trimethylamidinomethoxy)-2-(4'-thiazolyl)benzimidazole

Following the procedure of Example 57, react 1-(N,N-dimethylamidinomethoxy - 2 - (4'-thiazolyl)benzimidazole with methyl iodide to obtain 1-(N,N,N'-trimethylamidinomethoxy)-2-(4'-thiazolyl)benzimidazole as the hydroiodide salt.

EXAMPLE 59

1-(N,N'-dimethylamidinomethoxy)-2-(4'-thiazolyl)benzimidazole

Following the procedure of Example 57, react 2 molar equivalents of methyl iodide with 1-amidinomethoxy-2-(4'-thiazolyl)benzimidazole. Fractional crystallization yields 1-(N,N'-dimethylamidinomethoxy) - 2 - (4'-thiazolyl)benzimidazole.

EXAMPLE 60

2-(4'-thiazolyl)benzimidazol-1-yloxymethyl methylsulfone

Add 1.32 gm. of 85% metachloroperbenzoic acid to 0.9 gm. of 2-(4'-thiazolyl)benzimidazol - 1 - yloxymethyl methylsulfide dissolved in 40 ml. of chloroform at 0°. Stir the mixture at room temperature overnight. Extract the solution with aqueous sodium bicarbonate and separate the organic layer. Evaporate the solvent in vacuo. Recrystallize the residue from benzene to yield purified 2 - (4'-thiazolyl)benzimidazole-1-yloxymethyl methylsulfone. (M.P. 125–128° C.).

EXAMPLE 61

2-(4'-thiazolyl)benzimidazol-1-yloxymethyl methylsulfoxide

To a cooled solution of 4.0 gm. of 2-(4'-thiazolyl)benzimidazol-1-yloxymethyl methylsulfide in 100 ml. of chloroform, add 2.85 gm. of 85% meta chloroperbenzoic acid. Stir the resultant solution at room temperature for 12 hours. Extract the reaction mixture with aqueous sodium bicarbonate and separate the organic layer. After drying and evaporation of the solvent, recrystallize the residue from ethyl acetate to yield 2-(4'-thiazolyl)-benzimidazol-1-yloxymethyl methylsulfoxide. (M.P. 122–123° C.).

EXAMPLE 62
2-(4'-thiazolyl)benzimidazole-1-yloxyethyl phosphate

Mix 1 gm. of 1-hydroxyethoxybenzimidazole, 5.5 gm. of phosphoric acid anhydride and 6.85 gm. of orthophosphoric acid. Stir the mixture at room temperature for 24 hours. Flood the reaction mixture with water and separate the precipitate by filtration to provide 2-(4'-thiazolyl) benzimidazole-1-yloxyethyl phosphate.

EXAMPLE 63
2-(4'-thiazolyl)benzimidazole-1-yloxyethyl diethylphosphate

Dissolve 2.4 gm. of 1-(2-hydroxyethoxy)-2-(4'-thiazolyl)benzimidazole in 20 ml. of dry pyridine, held at 0° C. Add 1.71 g. of diethylphosphoryl chloride dropwise while maintaining a temperature of 0 to 5°. After addition is complete, stir at room temperature for 2 hours, dilute with water, extract with chloroform and evaporate the dried chloroform extract. Chromatography of the residue over silica gel and elution with ethyl acetate yields pure 2-(4'-thiazolyl)benzimidazole-1-yloxyethyl diethylphosphate.

Although the preceding examples have illustrated specifically preparation of 1-ether and 1-ester benzimidazoles wherein the benzimidazole moiety is 2-(4'-thiazolyl)benzimidazole, it will be obvious of course to anyone skilled in the art that any of the 1-ether and 1-ester benzimidazoles of this invention may be prepared by the illustrated techniques merely by employing any desired 1-hydroxybenzimidazole starting material as disclosed above in place of 1-hydroxy-2-(4'-thiazolyl)benzimidazole.

The subject matter which applicants regard as their invention is particularly pointed out and distinctly claimed as follows.

What is claimed is:
1. A compound selected from the group consisting of benzimidazoles having the formula:

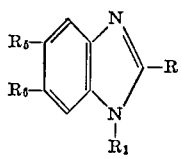

wherein
R is a member selected from the group consisting of phenyl, naphthyl, o-fluorophenyl, o-chlorophenyl, o-fluoronaphthyl, o-chloronaphthyl, thienyl, furyl, pyrryl, pyridyl, thiazolyl, isothiazoly and thiadiazolyl;
$R_5$ and $R_6$ are members selected from the group consisting of hydrogen, loweralkyl, loweralkoxy, loweralkylthio, phenoxy, phenylthio, halo, phenyl, halophenyl, amino, loweralkylamino, diloweralkylamino, thienyl, furyl, pyrryl, pyridyl, thiazolyl, isothiazolyl and thiadiazolyl, provided that when $R_5$ and $R_6$ are other than halo at least one of $R_5$ and $R_6$ is hydrogen; and
$R_1$ is a member selected from the group consisting of phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy and the $N_1$, $N_2$ and $N_3$ loweralkyl derivatives thereof, aminoguanidinoloweralkoxy and the N', $N_1$, $N_2$ and $N_3$ loweralkyl derivatives thereof, imidazolylaminoloweralkoxy and the 1-loweralkyl derivatives thereof, 1,4-5,6-tetrahydropyrimidinylaminoloweralkoxy and the 1-loweralkyl derivatives thereof, thiazolinylaminoloweralkoxy, thiazinylaminoloweralkoxy, imidazolinoloweralkoxy and the 1-loweralkyl derivatives thereof, 1,4,5,6 - tetrahydropyrimidinoloweralkoxy and the 1-loweralkyl derivatives thereof, loweralkanoyloxy, α-aminocarboxyloweralkoxy, glycosyloxy, p - loweralkylphenacyloxy and p - loweralkoxyphenacyloxy;
and alkali metal, alkaline earth metal and pharmaceutically acceptable amine salts thereof when $R_1$ is sulfoloweralkoxy phosphonoloweralkoxy, phosphatoloweralkoxy or α-aminocarboxyloweralkoxy; and salts thereof with pharmaceutically acceptable acids when $R_1$ is C-amindinoloweralkoxy, N-amidinoloweralkoxy, biguanidoloweralkoxy, guanidinoloweralkoxy, aminoguanidinoloweralkoxy, imidazolinylaminoloweralkoxy, tetrahydropyrimidinylaminoloweralkoxy, thiazolinylaminoloweralkoxy, thiazinylaminoloweralkoxy, imidazolinoloweralkoxy, tetrahydropyrimidinoloweralkoxy or α-aminocarboxyloweralkoxy.

2. A compound of claim 1 wherein $R_1$ is a member selected from the group consisting of phosphonolowearalkoxy, phosphatoloweralkoxy, sulfoloweralkoxy; C-amidinoloweralkoxy, N-amidinoloweralkoxy, biguanidoloweralkoxy, guanidinoloweralkoxy, aminoguanidinoloweralkoxy, 1,4,5,6-tetrahydropyrimidinoloweralkoxy, α-aminopyrimidinylaminoloweralkoxy, thiazolinylaminoloweralkoxy, thiazinylaminoloweralkoxy, imidazolinoloweralkoxy, 1,4,5,6-tetrahydropyrimidinoloweralkoxy, α-aminocarboxyloweralkoxy and glycosyloxy.

3. A compound of claim 1 wherein R is thiazolyl and $R_1$ is a member selected from the group consisting of C-amindinoloweralkoxy, N-amidinoloweralkoxy, guanidinoloweralkoxy, phosphonoloweralkoxy and sulfoloweralkoxy.

References Cited
UNITED STATES PATENTS
3,017,415   1/1962   Sarett et al. _____ 260—302 H ALEX MEZEL, Primary Examiner R. J. GALLAGHER, Assistant Examiner

U.S. Cl. X.R.
260—243 R, 247.1, 247.2 B, 256.4 H, 256.6 R, 268 B, 294.8 C, 295 F, 296 B, 390.2; 424—200, 246, 248, 250, 251, 263, 270, 273